(12) United States Patent
Abbasi et al.

(10) Patent No.: US 12,388,700 B2
(45) Date of Patent: Aug. 12, 2025

(54) CIRCUIT FOR CORRECTING AMPLITUDE IMBALANCE AND PHASE IMBALANCE

(71) Applicant: Renesas Electronics America Inc., Milpitas, CA (US)

(72) Inventors: Morteza Abbasi, Carlsbad, CA (US); Arjun Kamath, San Diego, CA (US); Tumay Kanar, Carlsbad, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 12 days.

(21) Appl. No.: 18/082,842

(22) Filed: Dec. 16, 2022

(65) Prior Publication Data
US 2024/0205067 A1    Jun. 20, 2024

(51) Int. Cl.
  *H04L 27/36* (2006.01)
  *H04L 27/34* (2006.01)
  *H04L 27/00* (2006.01)

(52) U.S. Cl.
  CPC ........ *H04L 27/364* (2013.01); *H04L 27/3411* (2013.01); *H04L 2027/0016* (2013.01)

(58) Field of Classification Search
  CPC ............... H04L 27/364; H04L 27/3411; H04L 2027/0016
  See application file for complete search history.

(56) References Cited

U.S. PATENT DOCUMENTS

| | | | |
|---|---|---|---|
| 6,054,883 A | 4/2000 | Ishihara | |
| 11,271,710 B1 | 3/2022 | Cho et al. | |
| 2003/0012305 A1* | 1/2003 | Auranen | H04L 27/3863 375/316 |
| 2006/0133548 A1* | 6/2006 | Oh | H03D 3/009 375/346 |
| 2011/0206144 A1* | 8/2011 | Yamamoto | H04L 27/2332 375/345 |

FOREIGN PATENT DOCUMENTS

| | | |
|---|---|---|
| KR | 100382864 B1 | 5/2003 |
| WO | 2002067519 A1 | 8/2002 |

* cited by examiner

*Primary Examiner* — David S Huang
(74) *Attorney, Agent, or Firm* — SCULLY, SCOTT, MURPHY & PRESSER, P.C.

(57) ABSTRACT

A correction circuit for correcting an amplitude imbalance and a phase imbalance between an in-phase signal and a quadrature signal, the correction circuit comprising a plurality of variable gain circuits configured to provide in-phase and quadrature signals having balanced amplitudes and balanced phases, wherein each variable gain circuit is configured to apply a gain to amplify, attenuate or to pass a signal.

19 Claims, 11 Drawing Sheets

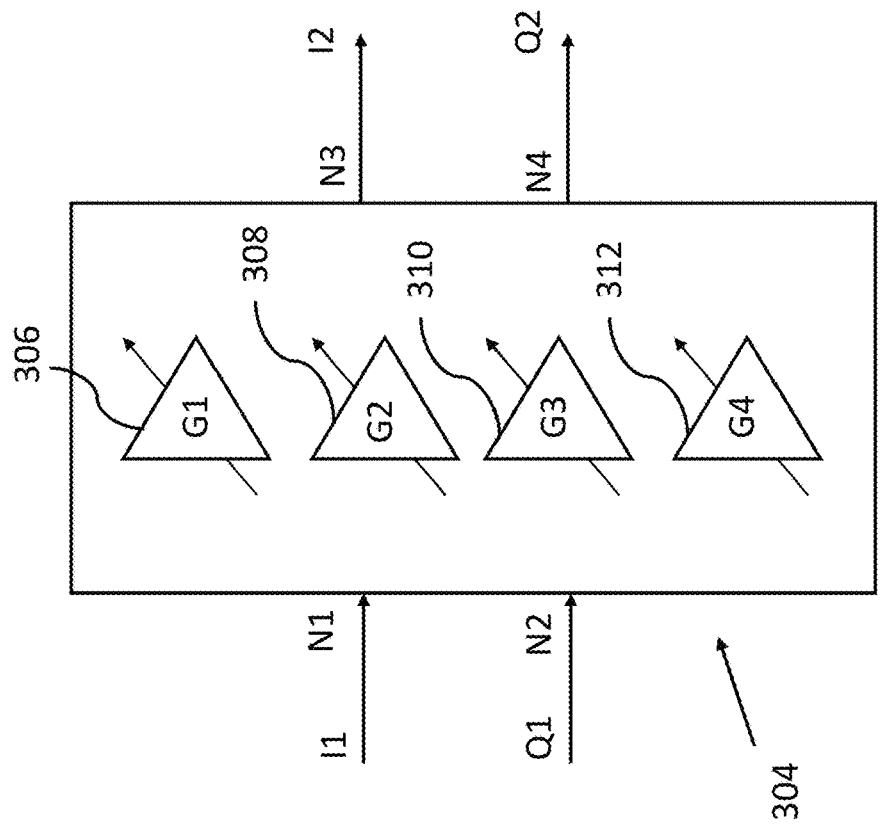
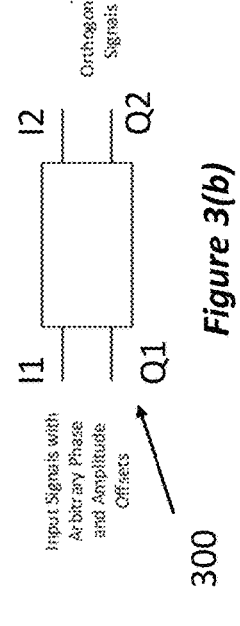
*Figure 3(a)*
*Figure 3(b)*
*Figure 3(c)*

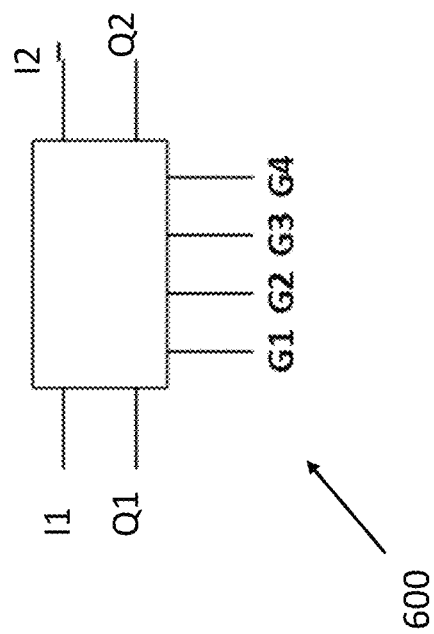
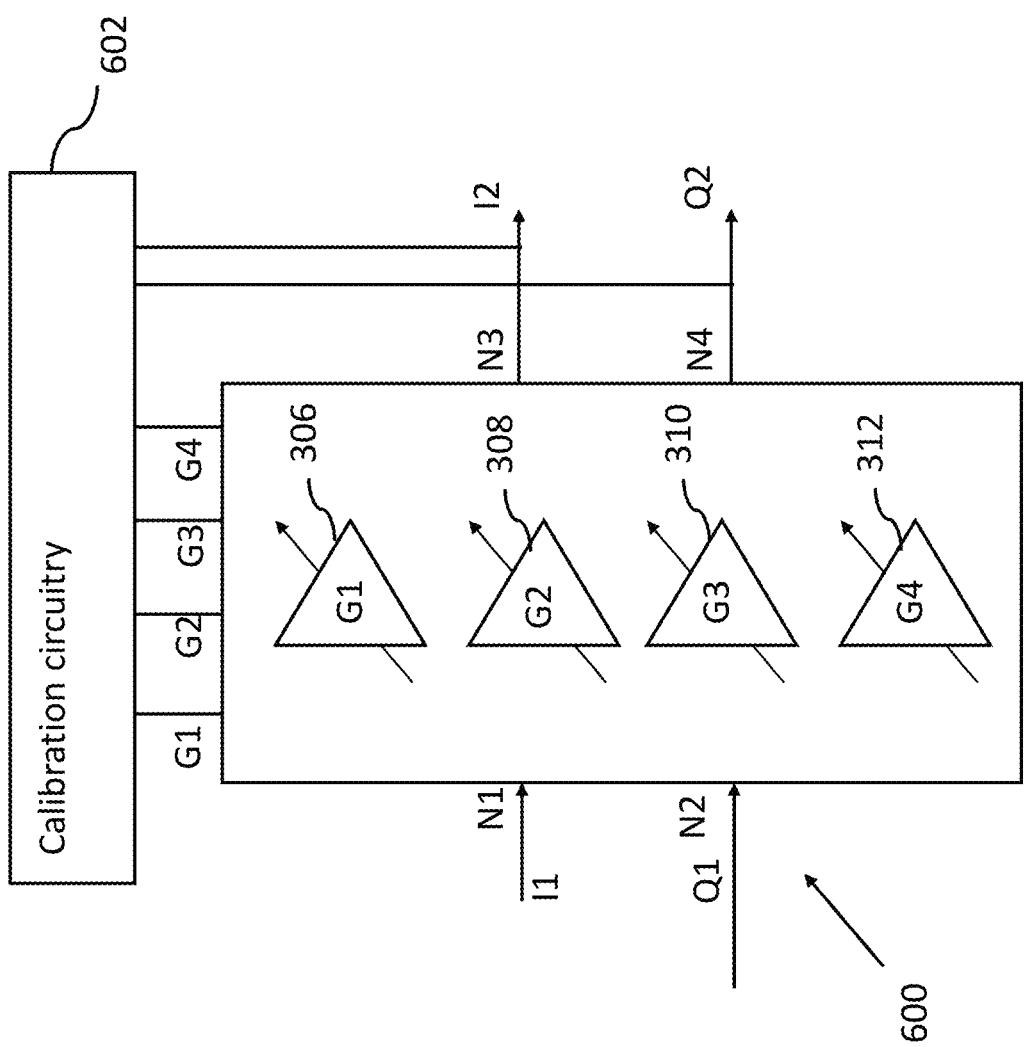
*Figure 6(b)*
*Figure 6(a)*

CIRCUIT FOR CORRECTING AMPLITUDE IMBALANCE AND PHASE IMBALANCE

The present disclosure relates to a correction circuit. In particular, the present disclosure relates to a correction circuit for correcting an amplitude imbalance and a phase imbalance between an in-phase signal and a quadrature signal.

BACKGROUND

"Quadrature signals" refer to two periodic signals with the same amplitude that have a phase difference of 90° with respect to each other. The signals are commonly referred to as an in-phase (I) signal and a quadrature (Q) signal, and may be referred to collectively as IQ signals.

Systems that use such signals include, but is not limited to, single side-band radio frequency transceivers, quadrature IQ radio frequency transceivers, phase rotating phase shifters, linearized power amplifiers, etc.

Impairments can arise between IQ signals, for example, where there is an imbalance between their amplitudes (where their peak amplitudes are unequal) and/or their phases (where the phase difference is not equal to 90°). These impairments can, for example, stem from differences in signal routing, mismatch in active and passive components of the circuits, as well as gradients in operation condition of the circuit such as temperature and voltage.

The impact of quadrature impairment on the system performance include, for example and not limited to, increased error vector magnitude (EVM) in the transmitter, increased interference from unwanted image frequencies in the receiver, increase phase error in the phase shifter, reduced power efficiency in a power amplifier, etc., all of which degrade the usability of the system in terms of available data transmission rate or power efficiency.

FIG. 1(a) is a graph showing an amplitude imbalance and a phase imbalance between IQ signals. Specifically, there is shown an in-phase signal (shown by a trace 100) and a quadrature signal (shown by a trace 102). $\Delta\alpha$ shows a difference in peak amplitude between the signals 100, 102; and $\Delta\theta$ shows the phase difference between the signals 100, 102 which is other than 90°. The in-phase signal 100 may be labelled as I1 prior to correction, and I2 after correction. The quadrature signal 102 may be labelled as Q1 prior to correction, and Q2 after correction.

FIG. 1(b) is a graph showing IQ signals 100, 102 without an amplitude or phase imbalance. In the present example, $\Delta\alpha=0$ and $\Delta\theta=90°$.

Techniques exist for correcting phase and amplitude imbalances in IQ signals. FIG. 2(a) is a schematic of a known system 200 for correcting phase imbalances in IQ signals. The system 200 comprises resistors 202, capacitors 204 and tuneable capacitors 206. FIG. 2(b) is a graph showing simulation results for a practical implementation of the system 200, where it is demonstrated that there is approximately 10° of phase tunability at 26 GHz. In the system 200, IQ signals are generated with the two-stage polyphase filter and subsequent tuneable capacitors 206 are used to adjust the phase if needed. Amplitude imbalance cannot be corrected for by capacitive tuning and may require additional gain/loss correction after phases are adjusted.

A known example for resolving amplitude and phase imbalance is shown in U.S. Pat. No. 6,054,883A. It is noted that U.S. Pat. No. 6,054,883A uses amplitude clipping, which can lead to a loss of information which may be contained on the amplitude of the signals.

Known solutions for resolving amplitude and phase imbalance in IQ signals may be prone to variations in component values due to fabrication tolerances as well as operating temperature. For example, the system 200 and the system of U.S. Pat. No. 6,054,883A would likely be susceptible to such issues.

SUMMARY

It is desirable to provide a system for correcting amplitude and phase imbalance that does not result in a loss of signal and/or can overcome issues with known systems resulting from process and/or temperature variations.

According to a first aspect of the disclosure there is provided a correction circuit for correcting an amplitude imbalance and a phase imbalance between an in-phase signal and a quadrature signal, the correction circuit comprising a plurality of variable gain circuits configured to provide in-phase and quadrature signals having balanced amplitudes and balanced phases, wherein each variable gain circuit is configured to apply a gain to amplify, attenuate or to pass a signal.

Optionally, each variable gain circuit is configured to amplify the signal when the gain is greater than one, and/or pass the signal when the gain is equal to one, and/or attenuate the signal when the gain is less than one.

Optionally, the in-phase signal and the quadrature signal have an amplitude imbalance when their amplitudes are unequal, and have balanced amplitudes when their amplitudes are approximately equal, and the in-phase signal and the quadrature signal have a phase imbalance when there is a phase difference of greater than or less than approximately 90° between the in-phase and quadrature signals, and have balanced phases when there is a phase difference of approximately 90° between the in-phase and quadrature signals.

Optionally, the correction circuit is configured to receive a first in-phase signal and a first quadrature signal provide a second in-phase signal and a second quadrature signal, wherein there is an amplitude imbalance and a phase imbalance between the first in-phase signal and the first quadrature signal, and the amplitudes and phases of the second in-phase signal and the second quadrature signal are balanced.

Optionally, the plurality of variable gain circuits comprises a first variable gain circuit configured to apply a first gain, a second variable gain circuit configured to apply a second gain, a third variable gain circuit configured to apply a third gain, and a fourth variable gain circuit configured to apply a fourth gain.

Optionally, the correction circuit comprises a first input node for receiving the first in-phase signal, a second input node for receiving the first quadrature signal, a first output node for providing the second in-phase signal, and a second output node for providing the second quadrature signal.

Optionally, the first variable gain circuit comprises a first input terminal coupled to the first input node, a first output terminal coupled to the first output node, the second variable gain circuit comprises a second input terminal coupled to the second input node, a second output terminal coupled to the first output node, the third variable gain circuit comprises a third input terminal coupled to the first input node, and a third output terminal coupled to the second output node, the fourth variable gain circuit comprises a fourth input terminal coupled to the second input node, and a fourth output terminal coupled to the second output node.

Optionally, the first, second, third and fourth gains are each dependent on one or both of a phase imbalance parameter θ, the phase imbalance parameter θ being the phase difference Δθ between the first in-phase signal and the first quadrature signal minus 90°, and an amplitude imbalance parameter α, the amplitude imbalance parameter α being the peak amplitude of the first in-phase signal or the peak amplitude of the first quadrature signal, divided by the other of the peak amplitude of the first in-phase signal and the peak amplitude of the first quadrature signal.

Optionally, the first gain is approximately equal to $$\frac{\cos(\theta/2)}{\cos^2(\theta/2) - \sin^2(\theta/2)}$$

and/or the second gain is approximately equal to $$\frac{\sin(\theta/2)}{\alpha(\cos^2(\theta/2) - \sin^2(\theta/2))}$$

and/or the third gain is approximately equal to $$\frac{\sin(\theta/2)}{\cos^2(\theta/2) - \sin^2(\theta/2)}$$

and/or the fourth gain is approximately equal to $$\frac{\cos(\theta/2)}{\alpha(\cos^2(\theta/2) - \sin^2(\theta/2))}.$$

Optionally, the plurality of variable gain circuits are configured to apply a phase rotation to the in-phase and quadrature signals.

Optionally, each variable gain circuit is configured to amplify the signal when the gain is greater than one, and/or pass the signal when the gain is equal to one, and/or attenuate the signal when the gain is less than one.

Optionally, the in-phase signal and the quadrature signal have an amplitude imbalance when their amplitudes are unequal, and have balanced amplitudes when their amplitudes are approximately equal, and the in-phase signal and the quadrature signal have a phase imbalance when there is a phase difference of greater than or less than approximately 90° between the in-phase and quadrature signals, and have balanced phases when there is a phase difference of approximately 90° between the in-phase and quadrature signals.

Optionally, the correction circuit is configured to receive a first in-phase signal and a first quadrature signal, provide a second in-phase signal and a second quadrature signal, wherein there is an amplitude imbalance and a phase imbalance between the first in-phase signal and the first quadrature signal, and the amplitudes and phases of the second in-phase signal and the second quadrature signal are balanced and have a phase rotation.

Optionally, the plurality of variable gain circuits comprises a first variable gain circuit configured to apply a first gain, a second variable gain circuit configured to apply a second gain, a third variable gain circuit configured to apply a third gain, and a fourth variable gain circuit configured to apply a fourth gain.

Optionally, the correction circuit comprises a first input node for receiving the first in-phase signal, a second input node for receiving the first quadrature signal, a first output node for providing the second in-phase signal, and a second output node for providing the second quadrature signal.

Optionally, the first variable gain circuit comprises a first input terminal coupled to the first input node, a first output terminal coupled to the first output node, the second variable gain circuit comprises a second input terminal coupled to the second input node, a second output terminal coupled to the first output node, the third variable gain circuit comprises a third input terminal coupled to the first input node, and a third output terminal coupled to the second output node, the fourth variable gain circuit comprises a fourth input terminal coupled to the second input node, and a fourth output terminal coupled to the second output node.

Optionally, the first, second, third and fourth gains are each dependent on a phase rotation parameter Φ, and one or both of a phase imbalance parameter θ, the phase imbalance parameter θ being the phase difference Δθ between the first in-phase signal and the first quadrature signal minus 90° and an amplitude imbalance parameter α, the amplitude imbalance parameter α being the peak amplitude of the first in-phase signal or the peak amplitude of the first quadrature signal, divided by the other of the peak amplitude of the first in-phase signal and the peak amplitude of the first quadrature signal.

Optionally, the first gain is approximately equal to $$\frac{\cos(\theta/2 - \phi)}{\cos(\theta/2 - \phi)\cos(\theta/2 + \phi) - \sin(\theta/2 - \phi)\sin(\theta/2 + \phi)}$$

and/or the second gain is approximately equal to $$\frac{\sin(\theta/2 + \phi)}{\alpha(\cos(\theta/2 - \phi)\cos(\theta/2 + \phi) - \sin(\theta/2 - \phi)\sin(\theta/2 + \phi))}$$

and/or the third gain is approximately equal to $$\frac{\sin(\theta/2 - \phi)}{\cos(\theta/2 - \phi)\cos(\theta/2 + \phi) - \sin(\theta/2 - \phi)\sin(\theta/2 + \phi)}$$

and/or the fourth gain is approximately equal to $$\frac{\cos(\theta/2 + \phi)}{\alpha(\cos(\theta/2 - \phi)\cos(\theta/2 + \phi) - \sin(\theta/2 - \phi)\sin(\theta/2 + \phi))}.$$

Optionally, the correction circuit comprises calibration circuitry configured to undertake a calibration process comprising detecting amplitude and phase imbalances, determining the gain of each of the plurality of variable gain circuits required to provide in-phase and quadrature signals having balanced amplitudes and phases, and adjusting the gain of each of the plurality of variable gain circuits, based on the determining, such that the gains of the variable gain circuits are suitable to provide in-phase and quadrature signals having balanced amplitudes and phases.

Optionally, the calibration circuitry is configured to undertake the calibration process during operation of the correction circuit.

Optionally, the calibration circuitry is configured to undertake the calibration process more than once.

Optionally, each variable gain circuit is configured to amplify the signal when the gain is greater than one, and/or pass the signal when the gain is equal to one, and/or attenuate the signal when the gain is less than one.

Optionally, the in-phase signal and the quadrature signal have an amplitude imbalance when their amplitudes are unequal, and have balanced amplitudes when their amplitudes are approximately equal, and the in-phase signal and the quadrature signal have a phase imbalance when there is a phase difference of greater than or less than approximately 90° between the in-phase and quadrature signals, and have balanced phases when there is a phase difference of approximately 90° between the in-phase and quadrature signals.

Optionally, the correction circuit is configured to receive a first in-phase signal and a first quadrature signal, provide a second in-phase signal and a second quadrature signal, wherein there is an amplitude imbalance and a phase imbalance between the first in-phase signal and the first quadrature signal, and the amplitudes and phases of the second in-phase signal and the second quadrature signal are balanced.

Optionally, the plurality of variable gain circuits comprises a first variable gain circuit configured to apply a first gain, a second variable gain circuit configured to apply a second gain, a third variable gain circuit configured to apply a third gain, and a fourth variable gain circuit configured to apply a fourth gain.

Optionally, the correction circuit comprises a first input node for receiving the first in-phase signal, a second input node for receiving the first quadrature signal, a first output node for providing the second in-phase signal, and a second output node for providing the second quadrature signal.

Optionally, the first variable gain circuit comprises a first input terminal coupled to the first input node, a first output terminal coupled to the first output node, the second variable gain circuit comprises a second input terminal coupled to the second input node, a second output terminal coupled to the first output node, the third variable gain circuit comprises a third input terminal coupled to the first input node, and a third output terminal coupled to the second output node, the fourth variable gain circuit comprises a fourth input terminal coupled to the second input node, and a fourth output terminal coupled to the second output node.

Optionally, the calibration circuitry is configured to detect the amplitude and phase imbalances by measuring one or more parameters of the first in-phase signal and the first quadrature signal that are dependent on the phase imbalance parameter $\theta$ and the amplitude imbalance parameter $\alpha$, and determining the phase imbalance parameter $\theta$ and the amplitude imbalance parameter $\alpha$ using the measured one or more parameters, wherein the phase imbalance parameter is $\theta$ is the phase difference between the first in-phase signal and the first quadrature signal minus 90°, and the amplitude imbalance parameter $\alpha$ is the peak amplitude of the first in-phase signal or the peak amplitude of the first quadrature signal, divided by the other of the peak amplitude of the first in-phase signal and the peak amplitude of the first quadrature signal.

Optionally, the one or more parameters is a side band rejection ratio.

Optionally, the calibration circuitry is configured to determine the gain of each of the plurality of variable gain circuits by using the phase imbalance parameter $\theta$ and the amplitude imbalance parameter $\alpha$.

Optionally, the first gain is approximately equal to $$\frac{\cos(\theta/2)}{\cos^2(\theta/2) - \sin^2(\theta/2)}$$

and/or the second gain is approximately equal to $$\frac{\sin(\theta/2)}{\alpha(\cos^2(\theta/2) - \sin^2(\theta/2))}$$

and/or the third gain is approximately equal to $$\frac{\sin(\theta/2)}{\cos^2(\theta/2) - \sin^2(\theta/2)}$$

and/or the fourth gain is approximately equal to $$\frac{\cos(\theta/2)}{\alpha(\cos^2(\theta/2) - \sin^2(\theta/2))}.$$

Optionally, the calibration circuitry is configured to determine the first gain as approximately equal to $$\frac{\cos(\theta/2 - \phi)}{\cos(\theta/2 - \phi)\cos(\theta/2 + \phi) - \sin(\theta/2 - \phi)\sin(\theta/2 + \phi)}$$

and/or the second gain as approximately equal to $$\frac{\sin(\theta/2 + \phi)}{\alpha(\cos(\theta/2 - \phi)\cos(\theta/2 + \phi) - \sin(\theta/2 - \phi)\sin(\theta/2 + \phi))}$$

and/or the third gain as approximately equal to $$\frac{\sin(\theta/2 - \phi)}{\cos(\theta/2 - \phi)\cos(\theta/2 + \phi) - \sin(\theta/2 - \phi)\sin(\theta/2 + \phi)}$$

and/or the fourth gain as approximately equal to $$\frac{\cos(\theta/2 + \phi)}{\alpha(\cos(\theta/2 - \phi)\cos(\theta/2 + \phi) - \sin(\theta/2 - \phi)\sin(\theta/2 + \phi))}.$$

According to a second aspect of the disclosure there is provided an apparatus comprising a first transceiver system comprising a first correction circuit for correcting an amplitude imbalance and a phase imbalance between an in-phase signal and a quadrature signal in the first transceiver system, the first correction circuit comprising a plurality of first variable gain circuits configured to provide in-phase and quadrature signals having balanced amplitudes and balanced phases, wherein each first variable gain circuit is configured to apply a gain to amplify, attenuate or to pass a signal.

Optionally, the apparatus comprises a second transceiver system comprising a second correction circuit for correcting an amplitude imbalance and a phase imbalance between an in-phase signal and a quadrature signal in the second transceiver system, the second correction circuit comprising a plurality of second variable gain circuits configured to provide in-phase and quadrature signals having balanced amplitudes and balanced phases, wherein each second variable gain circuit is configured to apply a gain to amplify, attenuate or to pass a signal.

Optionally, the plurality of first variable gain circuits are configured to apply a first phase rotation to the in-phase and quadrature signals of the first transceiver system, and the plurality of second variable gain circuits are configured to apply a second phase rotation to the in-phase and quadrature signals of the second transceiver system.

Optionally, the first and second phase rotations are unequal.

Optionally, the first transceiver system is a first RF transceiver.

Optionally the apparatus is a phase array antenna, a multiple channel digital beamforming antenna system, or an analog beamforming antenna system.

It will be appreciated that the apparatus of the second aspect may include providing and/or using features set out in the first aspect and can incorporate other features as described herein.

According to a third aspect of the disclosure there is provided a method of correcting an amplitude imbalance and a phase imbalance between an in-phase signal and a quadrature signal using a correction circuit comprising a plurality of variable gain circuits, each variable gain circuit being configured to apply a gain to amplify, attenuate or to pass a signal, the method comprising providing in-phase and quadrature signals having balanced amplitudes and balanced phases using the plurality of variable gain circuits.

It will be appreciated that the method of the third aspect may include providing and/or using features set out in the first aspect and/or the second aspect and can incorporate other features as described herein.

BRIEF DESCRIPTION OF THE DRAWINGS

The disclosure is described in further detail below by way of example and with reference to the accompanying drawings in which:

FIG. 3(a) is a schematic of a correction circuit in accordance with a first embodiment of the present disclosure, FIG. 3(b) is an alternative schematic of the correction circuit, FIG. 3(c) is a schematic of a correction circuit in accordance with a second embodiment of the present disclosure;

FIG. 6(a) is a schematic of a correction circuit in accordance with a fourth embodiment of the present disclosure, FIG. 6(b) is an alternative schematic of the correction circuit;

DETAILED DESCRIPTION

Figures 1A, 1B:
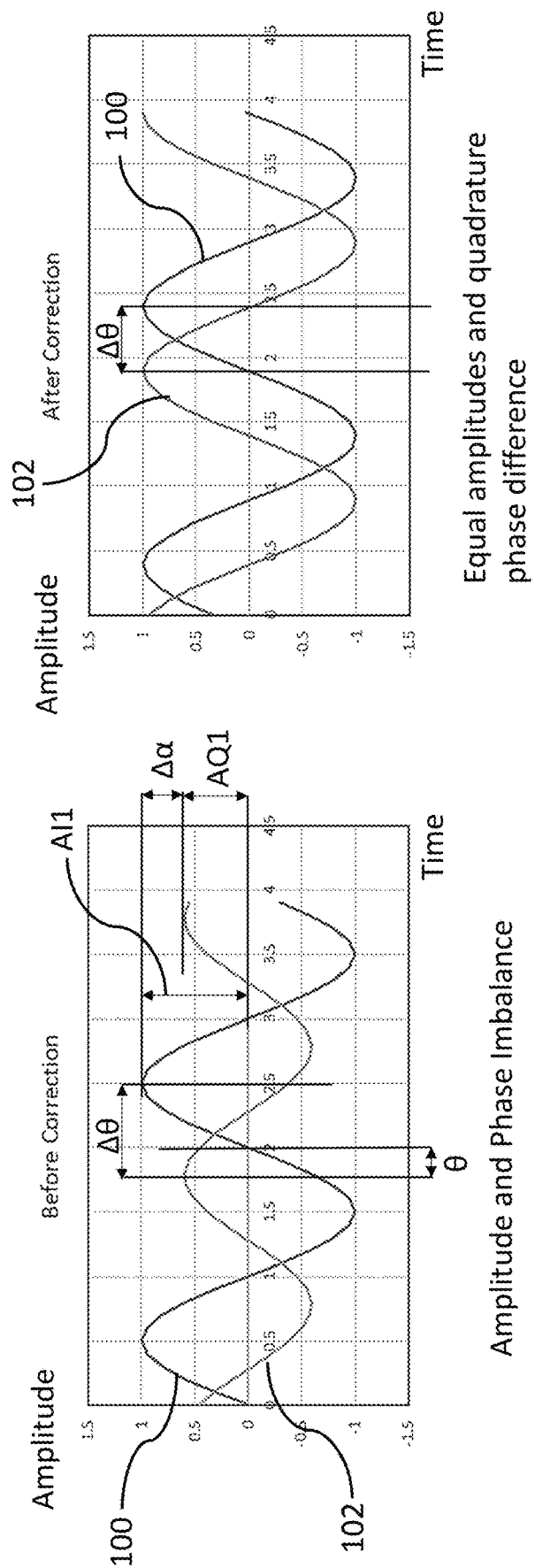
FIG. 1(a) is a graph showing an amplitude imbalance and a phase imbalance between IQ signals.
FIG. 1(b) is a graph showing IQ signals without an amplitude or phase imbalance.
Figure 2A:
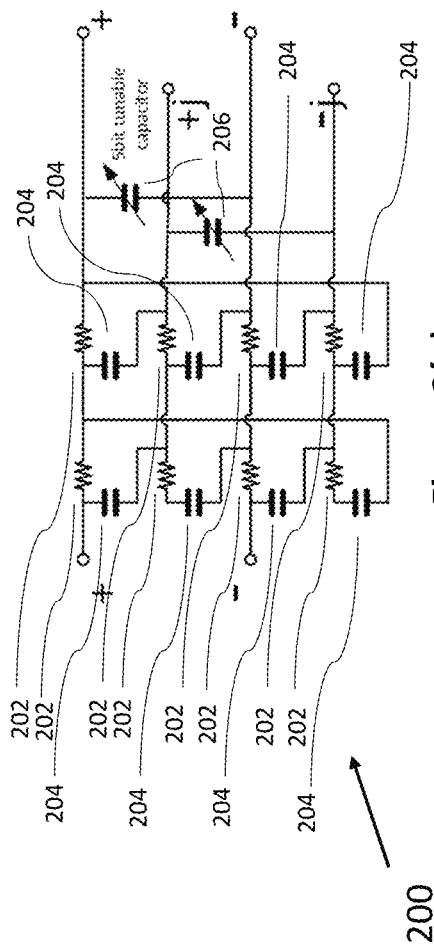
FIG. 2(a) is a schematic of a known system for correcting phase imbalances in IQ signals.
Figure 2B:
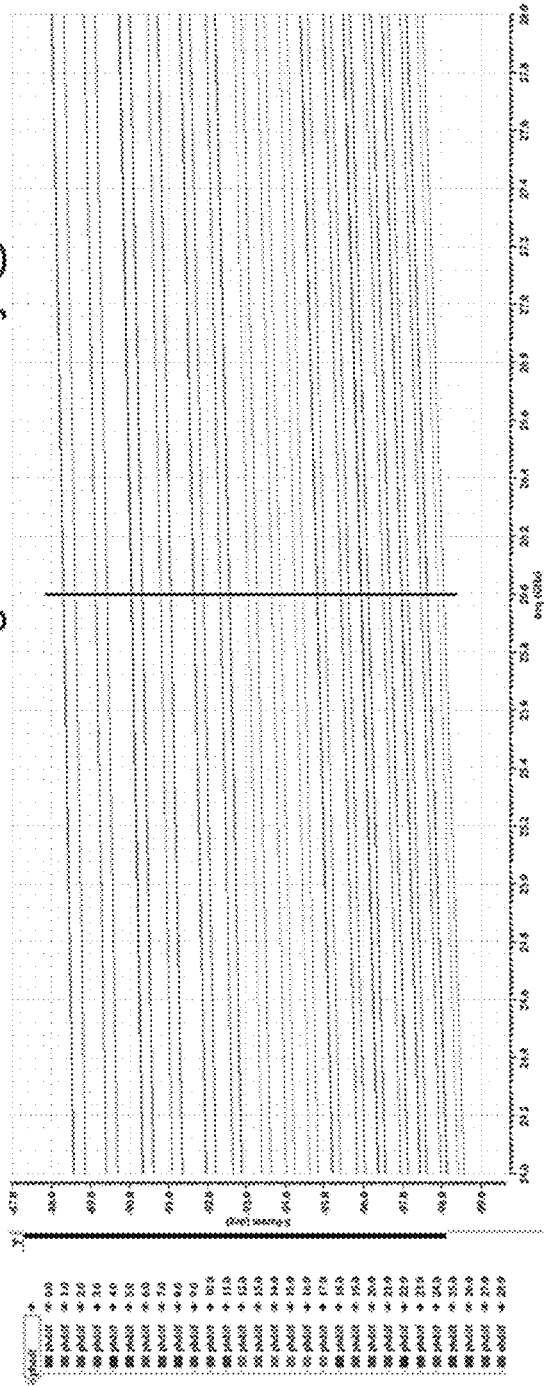
FIG. 2(b) is a graph showing simulation results for a practical implementation of the system.

FIG. 3(a) is a schematic of a correction circuit 300 for correcting an amplitude imbalance and a phase imbalance between an in-phase signal and a quadrature signal in accordance with a first embodiment of the present disclosure. The correction circuit 300 comprises a plurality of variable gain circuits 302 configured to provide in-phase and quadrature signals having balanced amplitudes and balanced phases. Each variable gain circuit 302 is configured to apply a gain to amplify, attenuate or to pass a signal. Each variable gain circuit 302 may be implemented using the same circuit components as each of the other variable gain circuits 302, and they may be referred to as "identical".

Each variable gain circuit 302 receives a signal at its input, applies a gain to the signal, then provides the resultant signal at its output. Each variable gain circuit 302 may be configured to do one or more of the following:

amplify the signal when the gain is greater than one
pass the signal when the gain is equal to one, where the input signal and the resultant signal are the same
attenuate the signal when the gain is less than one Although the term "gain" may typically be used when a signal is being amplified, it will be appreciated that a gain less than or equal to one may be applied to a signal, where a gain of less than one results in signal attenuation. In the present disclosure the term "gain" is used generally to refer to the application of a gain to amplify, pass or attenuate a signal, depending on the value of the gain, and this is not restricted only to amplification where the gain is greater than one.

As discussed previously, an in-phase signal and a quadrature signal have an amplitude imbalance when their amplitudes are unequal, and have balanced amplitudes when their amplitudes are approximately equal. Furthermore, an in-phase signal and a quadrature signal have a phase imbalance when there is a phase difference of greater than or less than approximately 90° between the in-phase and quadrature signals, and have balanced phases when there is a phase difference of approximately 90° between the in-phase and the quadrature signals.

The correction circuit 300 is configured to receive the in-phase signal I1 and the quadrature signal Q1 and to provide the in-phase signal I2 and the quadrature signal Q2. The signals I1, Q1 received by the correction circuit 300 exhibit an amplitude and phase imbalance, with the signals I2, Q2 being the corrected signals having balanced amplitudes and phases.

FIG. 3(b) is an alternative schematic of the correction circuit 300 with the variable gain circuits 302 omitted from the drawing.

FIG. 3(c) is a schematic of a correction circuit 304 in accordance with a second embodiment of the present disclosure. The correction circuit 304 comprises a variable gain circuit 306 configured to apply a gain G1; a variable gain circuit 308 configured to apply a gain G2; a variable gain circuit 310 configured to apply a gain G3; and a variable gain circuit 312 configured to apply a gain G4. The correction circuit 304 comprises input nodes N1 and N2 for receiving the signals I1 and Q1, respectively; and the output nodes N3 and N4 for providing the signals I2 and Q2, respectively.

Figure 4:
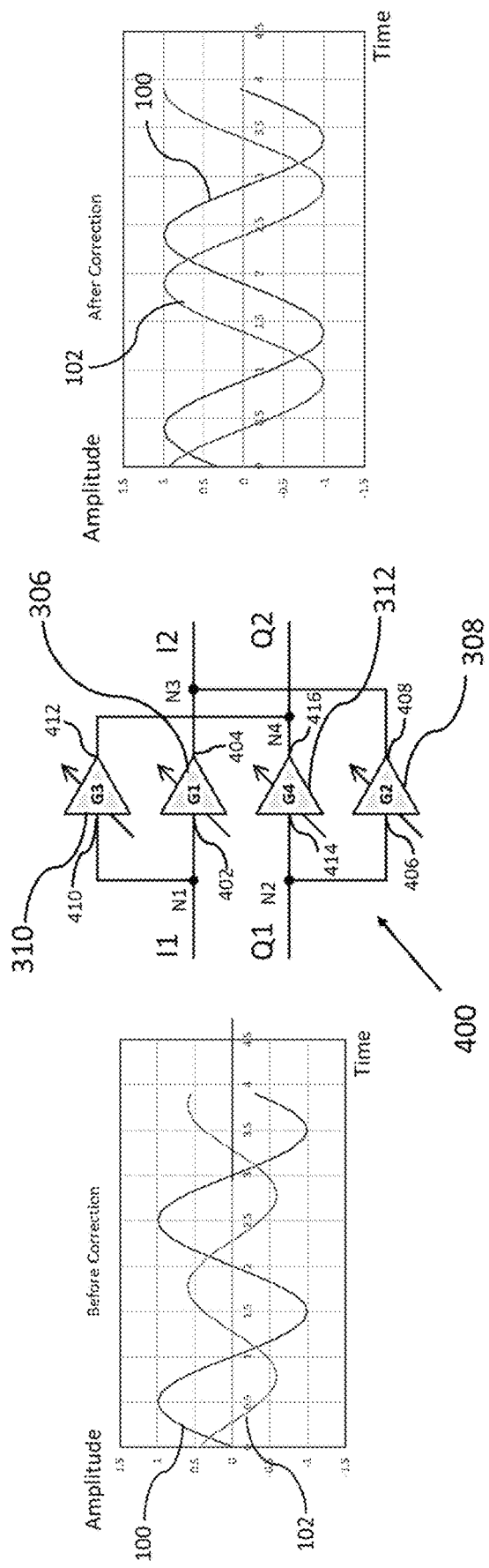
FIG. 4 is a schematic of a correction circuit in accordance with a third embodiment of the present disclosure.

FIG. 4 is a schematic of a correction circuit 400 in accordance with a third embodiment of the present disclosure. The variable gain circuit 306 comprises an input terminal 402 coupled to the input node N1 and an output terminal 404 coupled to the output node N3. The variable gain circuit 308 comprises an input terminal 406 coupled to the input node N2 and an output terminal 408 coupled to the output node N3. The variable gain circuit 310 comprises an input terminal 410 coupled to the input node N1 and an output terminal 412 coupled to the output node N4. The variable gain circuit 312 comprises an input terminal 414 coupled to the input node N2 and an output terminal 416 coupled to the output node N4.

The gains G1, G2, G3, G4 are each dependent on a phase imbalance parameter $\theta$ and/or an amplitude imbalance parameter $\alpha$. The phase imbalance parameter $\theta$ is the phase difference $\Delta\theta$ between the in-phase signal I1 and the quadrature signal Q1 minus 90° ($\theta = \Delta\theta - 90°$).

The amplitude imbalance parameter $\alpha$ is the peak amplitude of the in-phase signal I1 (denoted by AI1) or the peak amplitude of the quadrature signal Q1 (denoted by AQ1), divided by the other of the peak amplitude of the in-phase signal I1 and the peak amplitude of the quadrature signal Q1. For example, $\alpha = AQ1/AI1$.

The phase imbalance parameter $\theta$ and amplitude imbalance parameter $\alpha$ are as shown on FIG. 1(a).

The gain G1 may be as follows:

$$G1 = \frac{\cos(\theta/2)}{\cos^2(\theta/2) - \sin^2(\theta/2)} \tag{1}$$

The gain G2 may be as follows:

$$G2 = \frac{\sin(\theta/2)}{\alpha\left(\cos^2(\theta/2) - \sin^2(\theta/2)\right)} \tag{2}$$

The gain G3 may be as follows:

$$G3 = \frac{\sin(\theta/2)}{\cos^2(\theta/2) - \sin^2(\theta/2)} \tag{3}$$

The gain G4 may be as follows:

$$G4 = \frac{\cos(\theta/2)}{\alpha\left(\cos^2(\theta/2) - \sin^2(\theta/2)\right)} \tag{4}$$

The relationship between the signals I1, Q1, I2, Q2 may be written as follows:

$$I2 = G1 \times I1 + G2 \times Q1 \tag{5}$$

$$Q2 = G3 \times I1 + G4 \times Q1 \tag{6}$$

which may be rewritten as follows:

$$I2 = \frac{1}{k} \times \left[ I1 \, \cos(\theta/2) + Q1\left(\frac{\sin(\theta/2)}{\alpha}\right) \right] \tag{7}$$

$$Q2 = \frac{1}{k} \times \left[ I1 \, \sin(\theta/2) + Q1\left(\frac{\cos(\theta/2)}{\alpha}\right) \right] \tag{8}$$

where:

$$k = \cos^2(\theta/2) - \sin^2(\theta/2) \tag{9}$$

Variable gain circuits that are identical in design will be affected the same way by any temperature, voltage or process variations or other imperfections. Based on the equations (1)-(4) a common scaling of G1-G4 does not affect the principle of operation. In summary, any offset in the gain or phase response will be common to all variable gain circuits and will not affect the operation of the correction circuit.

In a further embodiment the plurality of variable gain circuits may be configured to apply a phase rotation to the in-phase and quadrature signals. A phase rotation refers to an offset in phase that would be applied equally to both the in-phase and quadrature signals, such that after correction they would both exhibit a 90° phase difference with respect to each other, in addition to a further phase shift with respect to a reference point.

The present embodiment can operate on two signals, I1 and Q1 with arbitrary amplitude and non-zero phase offset to produce two orthogonal signals I2 and Q2 with equal amplitudes and arbitrary rotation angle.

For example, for a phase rotation of 10° after correction, the in-phase signal I2 would exhibit a phase difference of 10° with respect to the reference point, and the quadrature signal Q2 would exhibit a phase difference of 100° with respect to the reference point.

In such an embodiment, the gains G1, G2, G3, G4 would each be dependent on a phase rotation parameter $\Phi$, as follows.

The gain G1 may be as follows:

$$G1 = \frac{\cos(\theta/2 - \phi)}{\cos(\theta/2 - \phi)\cos(\theta/2 + \phi) - \sin(\theta/2 - \phi)\sin(\theta/2 + \phi)} \tag{10}$$

The gain G2 may be as follows:

$$G2 = \frac{\sin(\theta/2 + \phi)}{\alpha\left(\cos(\theta/2 - \phi)\cos(\theta/2 + \phi) - \sin(\theta/2 - \phi)\sin(\theta/2 + \phi)\right)} \tag{11}$$

The gain G3 may be as follows:

$$G3 = \frac{\sin(\theta/2 - \phi)}{\cos(\theta/2 - \phi)\cos(\theta/2 + \phi) - \sin(\theta/2 - \phi)\sin(\theta/2 + \phi)} \tag{12}$$

The gain G4 may be as follows:

$$G4 = \frac{\cos(\theta/2 + \phi)}{\alpha(\cos(\theta/2 - \phi)\cos(\theta/2 + \phi) - \sin(\theta/2 - \phi)\sin(\theta/2 + \phi))} \quad (13)$$

The relationship between the signals I1, Q1, I2, Q2 may be written as follows:

$$I2 = \frac{1}{k} \times \left[ I1 \; \cos(\theta/2 - \phi) + Q1\left(\frac{\sin(\theta/2 + \phi)}{\alpha}\right) \right] \quad (14)$$

$$Q2 = \frac{1}{k} \times \left[ I1 \; \sin(\theta/2 - \phi) + Q1\left(\frac{\cos(\theta/2 + \phi)}{\alpha}\right) \right] \quad (15)$$

where:

$$k = \cos(\theta/2 - \phi)\cos(\theta/2 + \phi) - \sin(\theta/2 - \phi)\sin(\theta/2 + \phi) \quad (16)$$

Figure 5B:
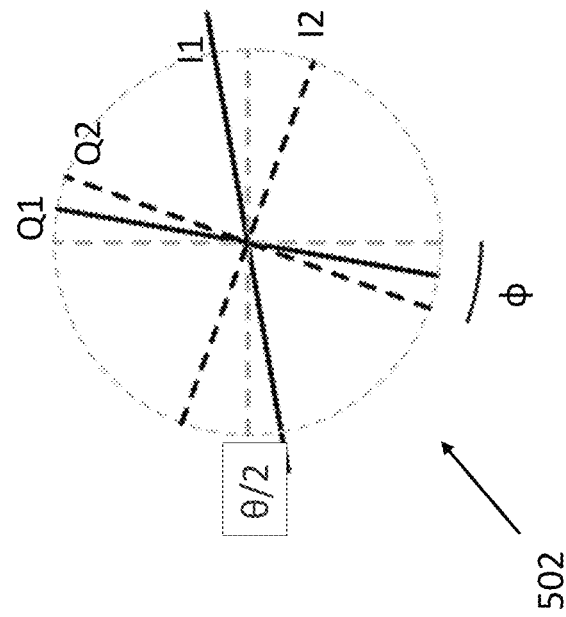
FIG. 5(b) is a graph showing the relative phases of the signals when there is a phase rotation.
Figure 5A:
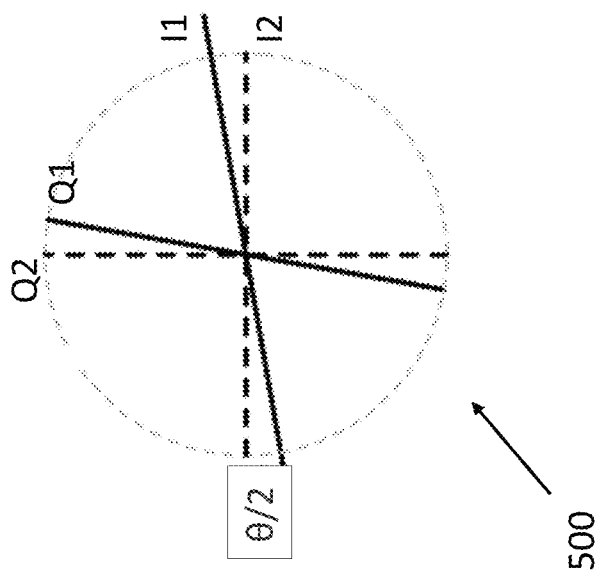
FIG. 5(a) is a graph showing the relative phases of signals.

FIG. 5(a) is a graph 500 showing the relative phases of the signals I1, Q1, I2, Q2. It can be observed that the corrected signals I2, Q2 correspond to the signals I1, Q2 after correction for the phase difference $\Delta\theta$. FIG. 5(b) is a graph 502 showing the relative phases of the signals I1, Q1, I2, Q2 when there is a phase rotation represented by the parameter $\phi$.

FIG. 6(a) is a schematic of a correction circuit 600 in accordance with a fourth embodiment of the present disclosure. In a specific embodiment, the correction circuit 600 may comprise the arrangement of variable gain circuits 306, 308, 310, 312 of the correction circuit 400 of FIG. 4.

The correction circuit 600 comprises calibration circuitry 602 configured to undertake a calibration process. The calibration circuitry 602 may provide self-calibrating functionality. The calibration process comprises the following steps: detecting amplitude and phase imbalances; determining the gains G1, G2, G3, G4 required to provide in-phase and quadrature signals having balanced amplitudes and phases; and then adjusting the gains G1, G2, G3, G4 to provide the corrected IQ signals. Calibration may be performed during operation of the operation of the correction circuit 600. The calibration process may be applied repeatedly to ensure that the correction circuit 600 functions as required and can adapt to changes in operating conditions, thereby providing adaptive circuitry. FIG. 6(b) is an alternative schematic of the correction circuit 600 with the calibration circuitry 602 omitted from the drawing.

The calibration circuitry 602 may be configured to detect the amplitude and phase imbalances by measuring one or more parameters of the in-phase signal I1 and/or the quadrature signal Q1 that are dependent on the phase imbalance parameter $\theta$ and the amplitude imbalance parameter $\alpha$; and determining the phase imbalance parameter $\theta$ and the amplitude imbalance parameter $\Delta\alpha$ using the measured one or more parameters.

The one or more parameters may relate to the phase difference and amplitude, such that their values can be inferred. For example, the one or more parameters be a side band rejection ratio which can be used to infer the amplitude and/or phase differences. In a further embodiment, the phase difference and amplitude difference may be determined directly from the signals I1, Q1.

The calibration circuitry 602 may be configured to determine the gains G1, G2, G3, G4 using the amplitude and/or phase differences. The gains G1, G2, G3, G4 may be determined using equations (1)-(4) or equations (10)-(13), when there is a phase rotation.

It will be appreciated that physical implementations of embodiments of the present disclosure may have their gains programmed in a factory, or by a user. Further physical implementations of embodiments, for example those comprising calibration circuitry, may comprise additional sensors in the system to implement an automated built-in calibration procedure, with no need for external apparatus. For example phase and amplitude imbalances:

May be directly measured by test equipment at the factory for every part. Gain settings of the respective variable gain circuits can then be calculated and set prior to final operation.

May be regularly measured by on-chip analog and digital converters placed on internal nodes. Gain settings of the respective variable gain circuits can then be calculated adaptively at different operation intervals.

May be inferred from secondary parameters which are easier to monitor with on-chip and external sensors than acquiring direct measurements of the phase and amplitude imbalances.

Figure 7B:
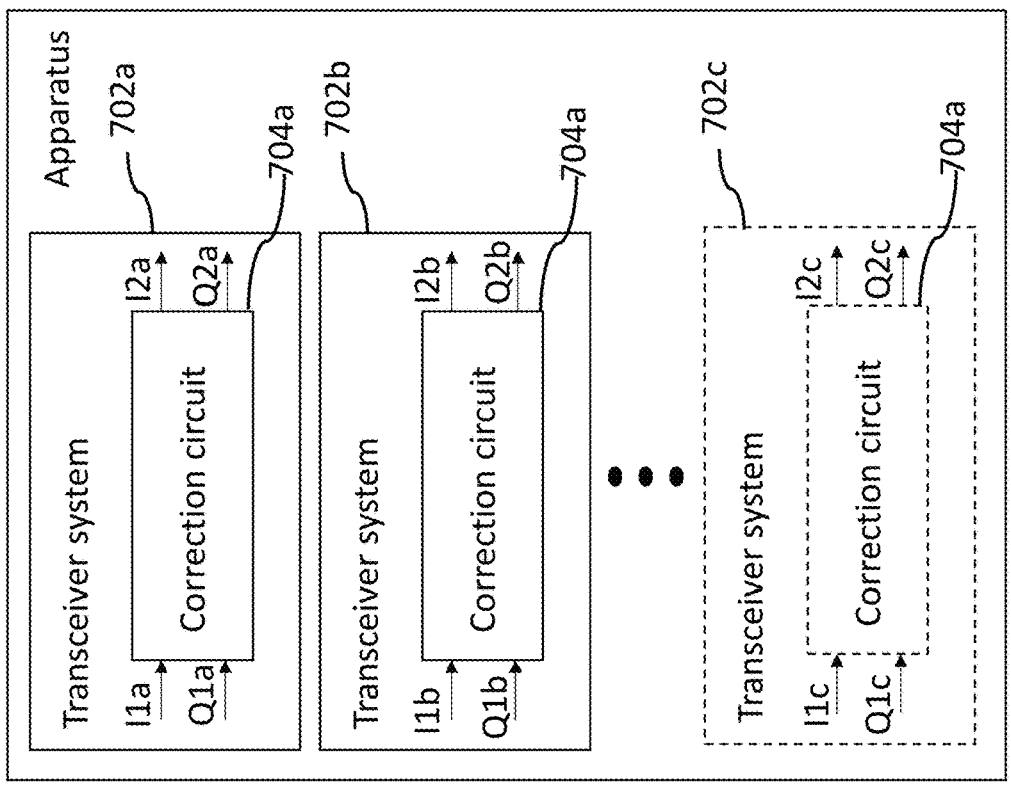
FIG. 7(b) is a schematic of an apparatus in accordance with a sixth embodiment of the present disclosure.
Figure 7A:
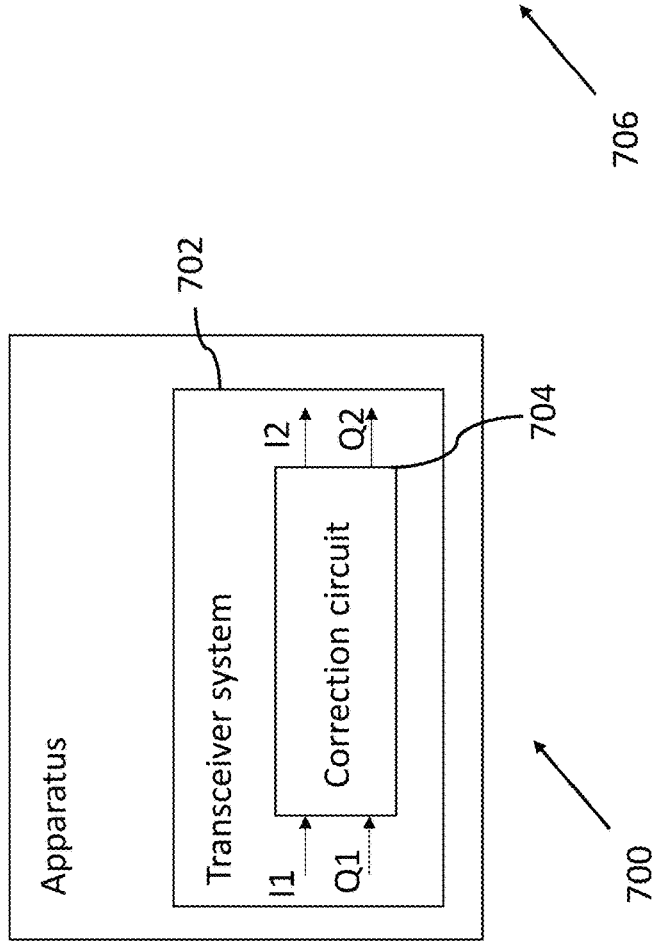
FIG. 7(a) is a schematic of an apparatus in accordance with a fifth embodiment of the present disclosure.

FIG. 7(a) is a schematic of an apparatus 700 comprising a transceiver system 702 comprising a correction circuit 704 for correcting an amplitude imbalance and a phase imbalance in IQ signals, and in accordance with a fifth embodiment of the present disclosure. The correction circuit 704 may be implemented by any of the correction circuits as disclosed herein, and in accordance with the understanding of the skilled person. The transceiver system 702 may, for example, be an RF transceiver.

The correction circuit 704 may, for example, function as a phase rotator. A phase rotator, may also be known as a phase interpolator circuit on the main signal path. These circuits find application in many systems, such as an in an analog beamforming antenna system.

As the correction circuit 704 is not implemented on the data signal path, it does not need to meet the speed and linearity requirements of the data signals used in the RF transceiver 702. The correction circuit 704 therefore does not limit the usable bandwidth of the system or add significant power consumption to the system budget.

FIG. 7(b) is a schematic of an apparatus 706 comprising two or more transceiver systems 702a, 702b, 702c, each comprising a correction circuits 704a, 704b, 704c, and in accordance with a sixth embodiment of the present disclosure. The correction circuits 704a, 704b, 704c may be implemented by any of the correction circuits as disclosed herein, and in accordance with the understanding of the skilled person. The transceiver systems 702a, 702b, 702c may, for example, be an RF transceiver. The signals for the correction circuit 704a have been labelled I1a, Q1a, I2a, Q2a; the signals for the correction circuit 704b have been labelled I1b, Q1b, I2b, Q2b; and the signals for the correction circuit 704c have been labelled I1c, Q1c, I2c, Q2c.

In specific embodiments, the proposed correction circuits may be implemented in complex systems like, for example a multi-channel digital beamforming antenna system, where multiple transceivers may exhibit different degrees of impairments and need to be corrected independently and accurately to obtain coherency between all received and/or transmitted data signals.

In a specific embodiment, the correction circuits 704a, 704b, 704c may be configured to apply phase rotations using the methods disclosed herein. Each of the correction circuits 704a, 704b, 704c may be configured to apply a different phase rotation.

Use the correction circuits as described here to apply phase rotations can be used to correct differences in signal routing when multiple transceivers are employed and expected to operate in phase with each other. Furthermore, they can be employed for beam steering in phase array antenna systems where multiple transceivers are expected to operate with determined phase offset from each other.

The apparatuses 700, 706 may, for example, be a phase array antenna, a multiple channel digital beamforming antenna system or an analog beamforming antenna system.

In summary, the correction circuits may, in addition to correcting for quadrature impairments of each individual transceiver, also provide arbitrary phase offset between different transceivers. This is particularly useful for correcting differences in signal routing when multiple transceivers are employed and expected to operate in-phase with each other, e.g. in a digital beamforming antenna system.

Figure 8:
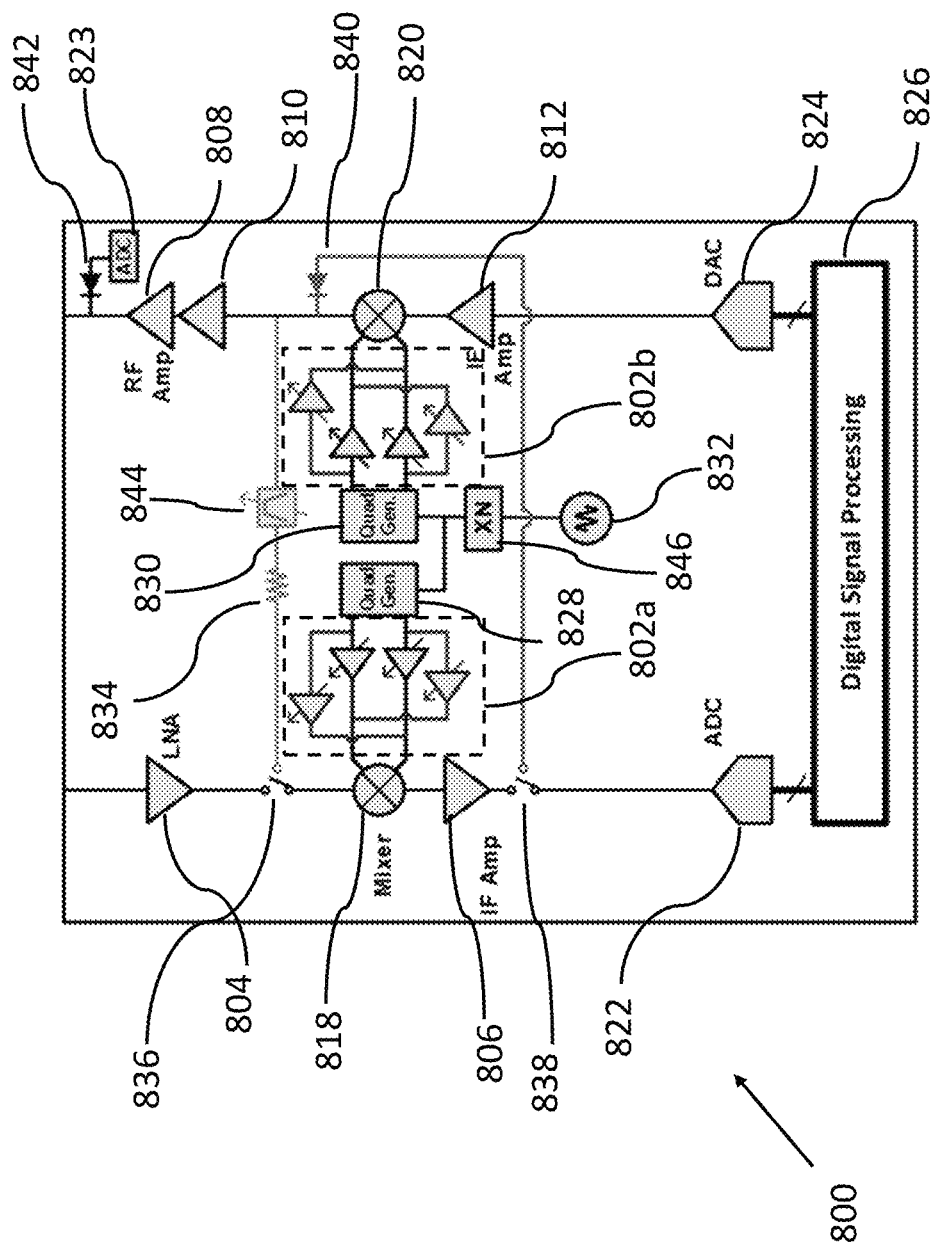
FIG. 8 is a schematic of an RF transceiver comprising correction circuits in accordance with a seventh embodiment of the present disclosure.

FIG. 8 is a schematic of an RF transceiver 800 comprising correction circuits 802a, 802b in accordance with a seventh embodiment of the present disclosure. The correction circuit 802a is implemented within a receiver portion of the transceiver 800 and the correction circuit 802b is implemented with a transmitter portion of the transceiver 800.

The transceiver 800 further comprises amplifiers 804, 806, 808, 810, 812; mixers 818, 820; ADC 822, 823; DAC 824; digital processing circuitry 826; quadrature signal generators 828, 830; oscillation circuitry 832; a resistor 834; switches 836, 838; diodes 840, 842; and circuit components 844, 846.

FIG. 8 shows a built-in self-testing scheme for measuring sideband rejection. FIG. 8 shows a general radio frequency transceiver where the proposed solution is implemented on the LO signal of both the receiver and the transmitter. Additional possibilities for detection sensors and loop back paths are shown which together with the correction circuits provide a built-in self-test scheme.

In the present embodiment, the correction circuits 802a, 802b may enable the single sideband transmitter or receiver to operate in either upper sideband (USB) and lower sideband (LSB) modes to perform self-calibration of the transceiver using built-in sensors and internal loop-back paths.

In a specific embodiment, the correction circuits 802a, 802b may be used to pre-distort the signal prior to nonlinear circuits, for example a power amplifier, to linearize the overall response of the system.

Figure 9:
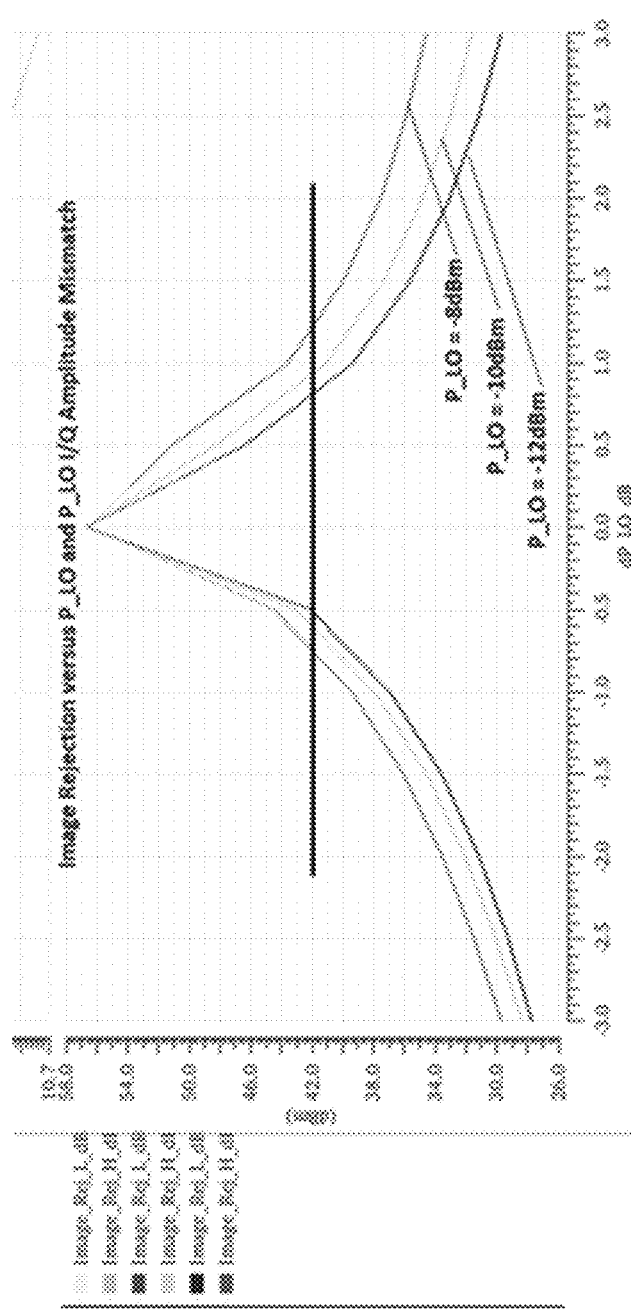
FIG. 9 is a graph showing sideband rejection versus amplitude mismatch.

FIG. 9 is a graph showing sideband rejection versus amplitude mismatch. As seen level of the rejection is affected by both amplitude and phase imbalance of the quadrature local oscillator signals. Therefore, the sideband rejection ratio may be used to infer the amplitude and phase imbalanced for the purpose of adjusting the gains of the variable gain circuits, as discussed previously.

Figures 10A, 10B:
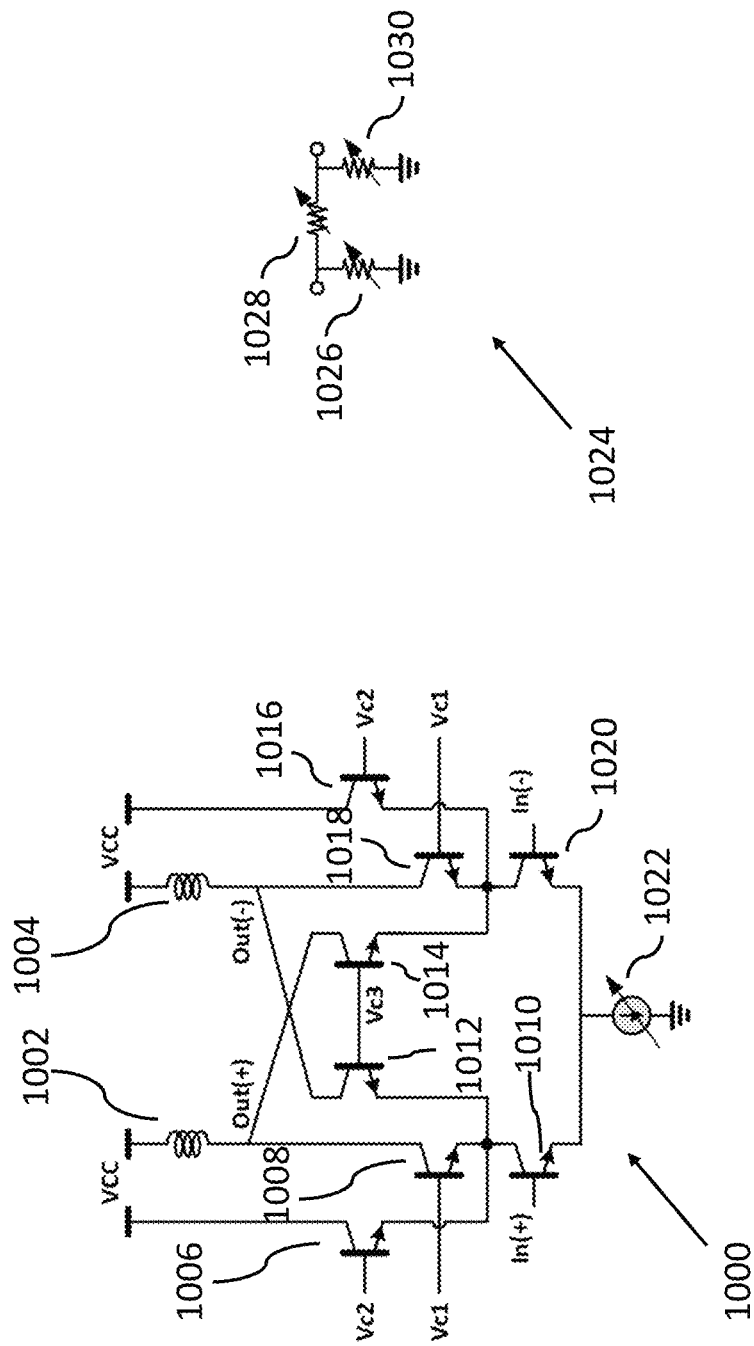
FIG. 10(a) is a schematic of a specific embodiment of a variable gain circuit.
FIG. 10(b) is a schematic of a specific embodiment of a further variable gain circuit.

FIG. 10(a) is a schematic of a specific embodiment of a variable gain circuit 1000 as may be used in embodiments of the present disclosure, in accordance with the understanding of the skilled person. The variable gain circuit comprises inductors 1002, 1004; transistors 1006, 1008, 1010, 1012, 1014, 1016, 1018, 1020; and a current source 1022.

FIG. 10(b) is a schematic of a specific embodiment of a variable gain circuit 1024 as may be used in embodiments of the present disclosure, in accordance with the understanding of the skilled person. The variable gain circuit 1024 comprises variable resistors 1026, 1028, 1030.

Figure 11B:
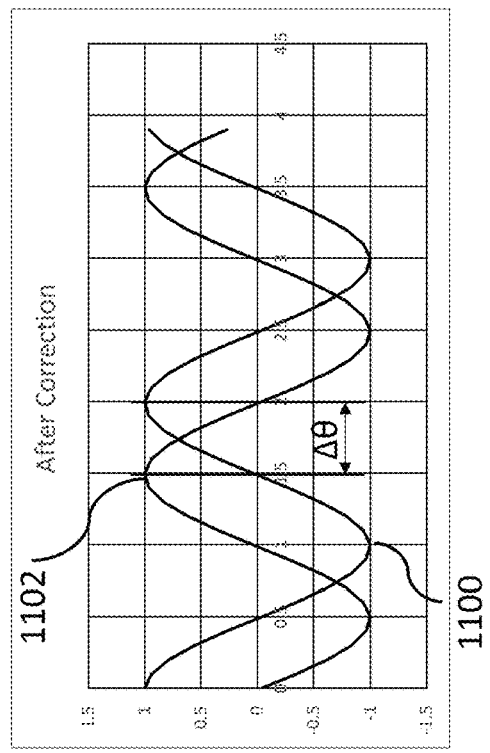
FIG. 11(b) is a graph showing IQ signals after correction.
Figure 11A:
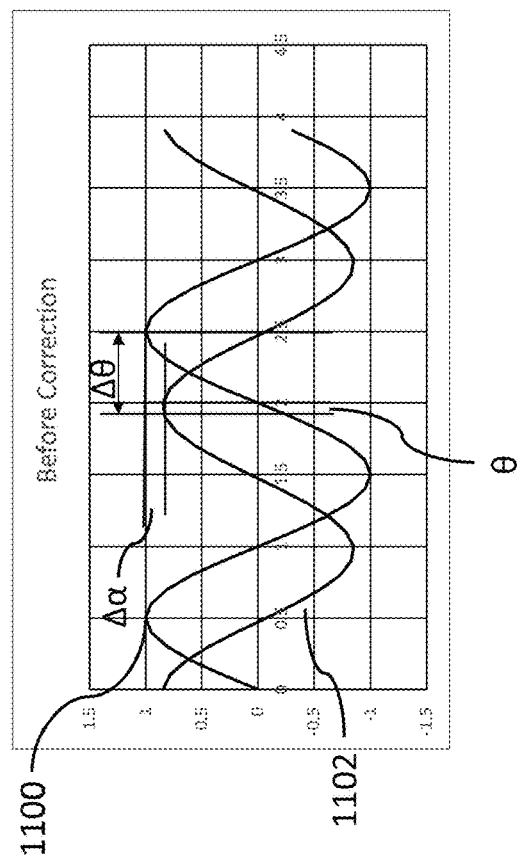
FIG. 11(a) is a graph showing an amplitude imbalance and a phase imbalance between IQ signals.

FIG. 11(a) is a graph showing an amplitude imbalance and a phase imbalance between IQ signals. Specifically, there is shown an in-phase signal (shown by a trace 1100) and a quadrature signal (shown by a trace 1102). FIG. 11(b) is a graph showing IQ signals 1100, 1102 without an amplitude or phase imbalance, after being corrected using the methods as disclosed herein.

In the present example, there has been applied a phase rotation of 90° such that the phase rotation parameter $\Phi=90°$.

The phase imbalance parameter $\theta$ is determined by the following: $\theta=\Delta\theta-90°$. As the phase difference $\Delta\theta=95°$ prior to correction, the phase imbalance parameter $\theta=5°$.

The amplitude of the quadrature signal 1102 is AQ1=0.85, and the amplitude of the in phase signal 1100 is AI1=1. Therefore, the amplitude imbalance parameter $\alpha=0.85$ prior to correction.

Using equations (10)-(13) the gains to provide the corrected IQ signals in FIG. 11(b) are as follows: G1=0.043786; G2=1.179840498; G3=−1.00286; G4=−0.05151.

Embodiments of the present disclosure use variable gain circuits to correct for phase and gain imbalances in IQ signals. As each of the variable gain circuits will respond in the same way to process and temperature variations it is possible to correct for the effect of these variations in a simpler way that is possible in circuits including multiple different components, which may each respond differently to process and temperature variations. An example of a system that uses different components, and would be subject to this shortcoming, is shown in U.S. Pat. No. 6,054,883A. Furthermore, embodiments of the present disclosure do not use "amplitude clipping" as is the case for U.S. Pat. No. 6,054,883A and can result in a loss of signal.

Embodiments disclosed herein may use a systematic algorithm and can be made insensitive to variations in the value of circuit components.

Common reference numerals or variables between Figures represent common features.

Various improvements and modifications may be made to the above without departing from the scope of the disclosure.

The invention claimed is:

1. A correction circuit for correcting an amplitude imbalance and a phase imbalance between an in-phase signal and a quadrature signal, the correction circuit comprising:
a plurality of variable gain circuits configured to provide in-phase and quadrature signals having balanced amplitudes and balanced phases, wherein:
each variable gain circuit is configured to apply a gain to amplify, attenuate or to pass a signal, and
the gain for each variable gain circuit is approximately equal to:

$$\frac{\cos(\theta/2)}{\cos^2(\theta/2) - \sin^2(\theta/2)}$$

and/or;

$$\frac{\sin(\theta/2)}{\alpha(\cos^2(\theta/2) - \sin^2(\theta/2))}$$

and/or;

$$\frac{\sin(\theta/2)}{\cos^2(\theta/2) - \sin^2(\theta/2)}$$

and/or;

$$\frac{\cos(\theta/2)}{\alpha(\cos^2(\theta/2) - \sin^2(\theta/2))},$$

the phase imbalance parameter $\theta$ being the phase difference $\Delta\theta$ between the in-phase signal and the quadrature signal minus 90°; and the amplitude imbalance parameter $\alpha$ being the peak amplitude of the in-phase signal or the peak amplitude of the quadrature signal, divided by the other of the peak amplitude of the in-phase signal and the peak amplitude of the quadrature signal.

2. The correction circuit of claim 1 configured to:
receive a first in-phase signal and a first quadrature signal;
provide a second in-phase signal and a second quadrature signal; wherein:
there is an amplitude imbalance and a phase imbalance between the first in-phase signal and the first quadrature signal; and
the amplitudes and phases of the second in-phase signal and the second quadrature signal are balanced.

3. The correction circuit of claim 2, wherein the plurality of variable gain circuits comprises:
a first variable gain circuit configured to apply a first gain;
a second variable gain circuit configured to apply a second gain;
a third variable gain circuit configured to apply a third gain; and
a fourth variable gain circuit configured to apply a fourth gain.

4. The correction circuit of claim 3, comprising:
a first input node for receiving the first in-phase signal;
a second input node for receiving the first quadrature signal;
a first output node for providing the second in-phase signal; and
a second output node for providing the second quadrature signal.

5. The correction circuit of claim 4, wherein:
the first variable gain circuit comprises:
i) a first input terminal coupled to the first input node; and
ii) a first output terminal coupled to the first output node;
the second variable gain circuit comprises:
i) a second input terminal coupled to the second input node; and
ii) a second output terminal coupled to the first output node;
the third variable gain circuit comprises:
i) a third input terminal coupled to the first input node; and
ii) a third output terminal coupled to the second output node; and
the fourth variable gain circuit comprises:
i) a fourth input terminal coupled to the second input node; and
ii) a fourth output terminal coupled to the second output node.

6. The correction circuit of claim 5, wherein:
the first gain is approximately equal to $$\frac{\cos\left(\frac{\theta}{2}\right)}{\cos^2\left(\frac{\theta}{2}\right) - \sin^2\left(\frac{\theta}{2}\right)}$$

and/or;
the second gain is approximately equal to $$\frac{\sin\left(\frac{\theta}{2}\right)}{\alpha\left(\cos^2\left(\frac{\theta}{2}\right) - \sin\left(\frac{\theta}{2}\right)\right)}$$

and/or;
the third gain is approximately equal to $$\frac{\sin\left(\frac{\theta}{2}\right)}{\cos^2\left(\frac{\theta}{2}\right) - \sin^2\left(\frac{\theta}{2}\right)}$$

the fourth gain is approximately equal to $$\frac{\cos\left(\frac{\theta}{2}\right)}{\alpha\left(\cos^2\left(\frac{\theta}{2}\right) - \sin^2\left(\frac{\theta}{2}\right)\right)}.$$

7. The correction circuit of claim 1, wherein the plurality of variable gain circuits are configured to apply a phase rotation to the in-phase and quadrature signals.

8. The correction circuit of claim 7 configured to:
receive a first in-phase signal and a first quadrature signal; and
provide a second in-phase signal and a second quadrature signal,
wherein:
there is an amplitude imbalance and a phase imbalance between the first in-phase signal and the first quadrature signal; and
the amplitudes and phases of the second in-phase signal and the second quadrature signal are balanced and have a phase rotation.

9. The correction circuit of claim 8, wherein the plurality of variable gain circuits comprises:
a first variable gain circuit configured to apply a first gain;
a second variable gain circuit configured to apply a second gain;
a third variable gain circuit configured to apply a third gain; and
a fourth variable gain circuit configured to apply a fourth gain.

10. The correction circuit of claim 9, comprising:
a first input node for receiving the first in-phase signal;
a second input node for receiving the first quadrature signal;
a first output node for providing the second in-phase signal; and a second output node for providing the second quadrature signal.

11. The correction circuit of claim 10, wherein:
the first variable gain circuit comprises:
  i) a first input terminal coupled to the first input node; and
  ii) a first output terminal coupled to the first output node;
the second variable gain circuit comprises:
  i) a second input terminal coupled to the second input node; and
  ii) a second output terminal coupled to the first output node;
the third variable gain circuit comprises:
  i) a third input terminal coupled to the first input node; and
  ii) a third output terminal coupled to the second output node; and
the fourth variable gain circuit comprises:
  i) a fourth input terminal coupled to the second input node; and
  ii) a fourth output terminal coupled to the second output node.

12. The correction circuit of claim 11, wherein the first, second, third and fourth gains are each dependent on:
a phase rotation parameter $\phi$; and
one or both of:
  i) the phase imbalance parameter $\theta$; and
  ii) the amplitude imbalance parameter $\alpha$.

13. The correction circuit of claim 12, wherein:
the first gain is approximately equal to $$\frac{\cos(\theta/2 - \phi)}{\cos(\theta/2 - \phi)\cos(\theta/2 + \phi) - \sin(\theta/2 - \phi)\sin(\theta/2 + \phi)}$$

and/or;
the second gain is approximately equal to $$\frac{\sin(\theta/2 + \phi)}{\alpha(\cos(\theta/2 - \phi)\cos(\theta/2 + \phi) - \sin(\theta/2 - \phi)\sin(\theta/2 + \phi))}$$

and/or;
the third gain is approximately equal to $$\frac{\cos(\theta/2 + \phi)}{\alpha(\cos(\theta/2 - \phi)\cos(\theta/2 + \phi) - \sin(\theta/2 - \phi)\sin(\theta/2 + \phi))}.$$

and/or;
the fourth gain is approximately equal to $$\frac{\sin(\theta/2 - \phi)}{\cos(\theta/2 - \phi)\cos(\theta/2 + \phi) - \sin(\theta/2 - \phi)\sin(\theta/2 + \phi)}.$$

14. The correction circuit of claim 1, comprising calibration circuitry configured to undertake a calibration process comprising:
detecting amplitude and phase imbalances;
determining the gain of each of the plurality of variable gain circuits required to provide in-phase and quadrature signals having balanced amplitudes and phases; and
adjusting the gain of each of the plurality of variable gain circuits, based on the determining, such that the gains of the variable gain circuits are suitable to provide in-phase and quadrature signals having balanced amplitudes and phases.

15. The correction circuit of claim 14 configured to:
receive a first in-phase signal and a first quadrature signal;
provide a second in-phase signal and a second quadrature signal; wherein:
there is an amplitude imbalance and a phase imbalance between the first in-phase signal and the first quadrature signal; and
the amplitudes and phases of the second in-phase signal and the second quadrature signal are balanced.

16. The correction circuit of claim 15, wherein the plurality of variable gain circuits comprises:
a first variable gain circuit configured to apply a first gain;
a second variable gain circuit configured to apply a second gain;
a third variable gain circuit configured to apply a third gain; and
a fourth variable gain circuit configured to apply a fourth gain.

17. The correction circuit of claim 16, comprising:
a first input node for receiving the first in-phase signal;
a second input node for receiving the first quadrature signal;
a first output node for providing the second in-phase signal; and
a second output node for providing the second quadrature signal.

18. An apparatus comprising a first transceiver system comprising a first correction circuit for correcting an amplitude imbalance and a phase imbalance between an in-phase signal and a quadrature signal in the first transceiver system, the first correction circuit comprising:
a plurality of first variable gain circuits configured to provide in-phase and quadrature signals having balanced amplitudes and balanced phases;
wherein:
  each first variable gain circuit is configured to apply a gain to amplify, attenuate or to pass a signal, and
  the gain for each variable gain circuit is approximately equal to:

$$\frac{\cos\left(\frac{\theta}{2}\right)}{\cos^2\left(\frac{\theta}{2}\right) - \sin^2\left(\frac{\theta}{2}\right)}$$

and/or;

$$\frac{\sin\left(\frac{\theta}{2}\right)}{\alpha\left(\cos^2\left(\frac{\theta}{2}\right) - \sin\left(\frac{\theta}{2}\right)\right)}$$

and/or;

$$\frac{\sin\left(\frac{\theta}{2}\right)}{\cos^2\left(\frac{\theta}{2}\right) - \sin^2\left(\frac{\theta}{2}\right)}$$

and/or;

$$\frac{\cos\left(\frac{\theta}{2}\right)}{\alpha\left(\cos^2\left(\frac{\theta}{2}\right)-\sin^2\left(\frac{\theta}{2}\right)\right)}.$$

the phase imbalance parameter $\theta$ being the phase difference $\Delta\theta$ between the in-phase signal and the quadrature signal minus 90°; and the amplitude imbalance parameter $\alpha$ being the peak amplitude of the in-phase signal or the peak amplitude of the quadrature signal, divided by the other of the peak amplitude of the in-phase signal and the peak amplitude of the quadrature signal.

19. A method of correcting an amplitude imbalance and a phase imbalance between an in-phase signal and a quadrature signal using a correction circuit comprising a plurality of variable gain circuits, each variable gain circuit being configured to apply a gain to amplify, attenuate or to pass a signal, wherein:

the gain for each variable gain circuit is approximately equal to:

$$\frac{\cos\left(\frac{\theta}{2}\right)}{\cos^2\left(\frac{\theta}{2}\right)-\sin^2\left(\frac{\theta}{2}\right)}$$

and/or;

$$\frac{\sin\left(\frac{\theta}{2}\right)}{\alpha\left(\cos^2\left(\frac{\theta}{2}\right)-\sin^2\left(\frac{\theta}{2}\right)\right)}$$

and/or;

$$\frac{\sin\left(\frac{\theta}{2}\right)}{\cos^2\left(\frac{\theta}{2}\right)-\sin^2\left(\frac{\theta}{2}\right)}$$

and/or;

$$\frac{\cos\left(\frac{\theta}{2}\right)}{\alpha\left(\cos^2\left(\frac{\theta}{2}\right)-\sin^2\left(\frac{\theta}{2}\right)\right)^2}$$

the phase imbalance parameter $\theta$ being the phase difference $\Delta\theta$ between the in-phase signal and the quadrature signal minus 90°; and the amplitude imbalance parameter $\alpha$ being the peak amplitude of the in-phase signal or the peak amplitude of the quadrature signal, divided by the other of the peak amplitude of the in-phase signal and the peak amplitude of the quadrature signal;

wherein the method comprising:

providing in-phase and quadrature signals having balanced amplitudes and balanced phases using the plurality of variable gain circuits.

\* \* \* \* \*